United States Patent [19]
Stover

[11] 3,826,327
[45] July 30, 1974

[54] VEHICLE BOTTOM GUARD STRUCTURE

[75] Inventor: David Emmert Stover, Dubuque, Iowa

[73] Assignee: Deere & Company, Moline, Ill.

[22] Filed: Dec. 18, 1972

[21] Appl. No.: 316,435

[52] U.S. Cl. ............................................. 180/69.1
[51] Int. Cl. ............................................ B62d 25/20
[58] Field of Search .......... 180/69.1, 69.01; 16/179

[56] References Cited
UNITED STATES PATENTS

| | | | |
|---|---|---|---|
| 1,213,848 | 1/1917 | Edgington | 180/69.1 |
| 1,429,449 | 9/1922 | Norelius | 180/54 D X |
| 2,132,266 | 10/1938 | Lefevre | 16/179 X |
| 2,291,495 | 7/1942 | Beals | 16/179 X |
| 3,670,835 | 6/1972 | Ross et al. | 180/69.1 |
| 3,754,615 | 8/1973 | McIndoo et al. | 180/69.1 |

*Primary Examiner*—David Schonberg
*Assistant Examiner*—David M. Mitchell

[57] ABSTRACT

Disclosed is an off-the-road vehicle having a forward-mounted engine, the bottom of which is protected from damage by obstacles by a bottom guard plate assembly which extends below the bottom of the engine and is releasably secured to the main frame of the vehicle. The plate assembly comprises a centrally located access opening which is normally closed by an access door which is held in place by a plurality of releasable cap screws. The door is provided with a pair of hooks along one of its sides, the hooks cooperating with a pair of abutments located along one side of the access opening of the plate assembly to form a hinge about which the door is vertically swingable once the cap screws have been removed. For the purpose of aiding in the installation and removal of the plate assembly to and from its normal position at the underside of the engine, there is provided a length of proof-coil chain which has one end welded to a tractor frame member located above one end of the plate assembly and having a link at its other end slipped over a hook formed on the upper side of the plate assembly. The upper side of the plate assembly is provided with a planar debris-collecting plate which overlies reinforcing ribs of the assembly exclusive of the access door. The access door is also provided with reinforcing ribs.

7 Claims, 5 Drawing Figures

VEHICLE BOTTOM GUARD STRUCTURE

BACKGROUND OF THE INVENTION

The present invention relates to a vehicle bottom guard for protecting vehicle components which are located low in the vehicle such as the bottoms of the vehicle engine and drive train housings.

It is common practice in the art to provide off-the-road vehicles with some sort of bottom guard structure to prevent vehicle components from being damaged by obstructions such as rocks, logs and the like which the vehicle may traverse during operation. These bottom guard structures usually comprise one or more relatively heavy plate assemblies which, when installed, block access to vehicle components such as drain plugs, filters and the like to which the operator must have access to perform routine service or maintenance operations; and the plate assemblies also act to collect foeign matter on their upper sides. In the case of forestry vehicles, this foreign matter is often constituted by flammable debris such as twigs and pine needles which present a fire hazard if accumulations thereof are not periodically removed from the top of the plate assemblies.

In order to obviate the necessity of removing the relatively heavy plate assemblies in their entirety from the bottom sides of the vehicles to perform routine service or maintenance operations and/or to remove trapped materials from the tops of the plate assemblies, some known plate assemblies include access openings and doors releasably secured over the openings. However, these known plate assemblies are not entirely satisfactory since many include reinforcing ribs or the like on their upper side which prevent easy clearing of material from their upper sides and/or they are constructed such that during operation they become bent to such an extent that the doors cannot easily be removed therefrom.

A further disadvantage of known bottom guard constructions is that the sole means for securing the plate assemblies to the vehicle frame are a plurality of cap screws. Thus, when removing the bottom guard from the vehicle, for the purpose of performing major repairs to the vehicle, the operator must be extremely careful lest he be struck by the plate assembly when the last of the cap screws are removed.

SUMMARY OF THE INVENTION

According to the present invention, there is provided an improved vehicle bottom guard structure and more particularly there is provided a bottom guard structure comprising a plate assembly including an access opening and an access door.

It is an object of the invention to provide a bottom guard plate assembly which includes an access door which is easily movable between closed and open positions relative to an access opening in the plate assembly even though the plate assembly may have become bent during operation. A related object of the invention is to provide a plate assembly which is reinforced to minimize the type of bends which would result in a door becoming difficult to remove.

A more specific object of the invention is to provide a door which is hingedly connected to the remainder of the plate assembly by a hinge constituted by a pair of hooks carried at one side of the door and a pair of abutments located on the upper side of the plate assembly along one side of the access opening and engageable by the hooks.

A further object of the invention is to provide a flexible element for supporting one end of the plate assembly from the vehicle main frame so as to maintain one end of the plate assembly in an elevated position when all of the fasteners connecting the plate assembly to the main frame have been removed.

These and other objects will be apparent from the following description and the appended drawings.

DESCRIPTION OF THE PREFERRED EMBODIMENT

Figure 1:
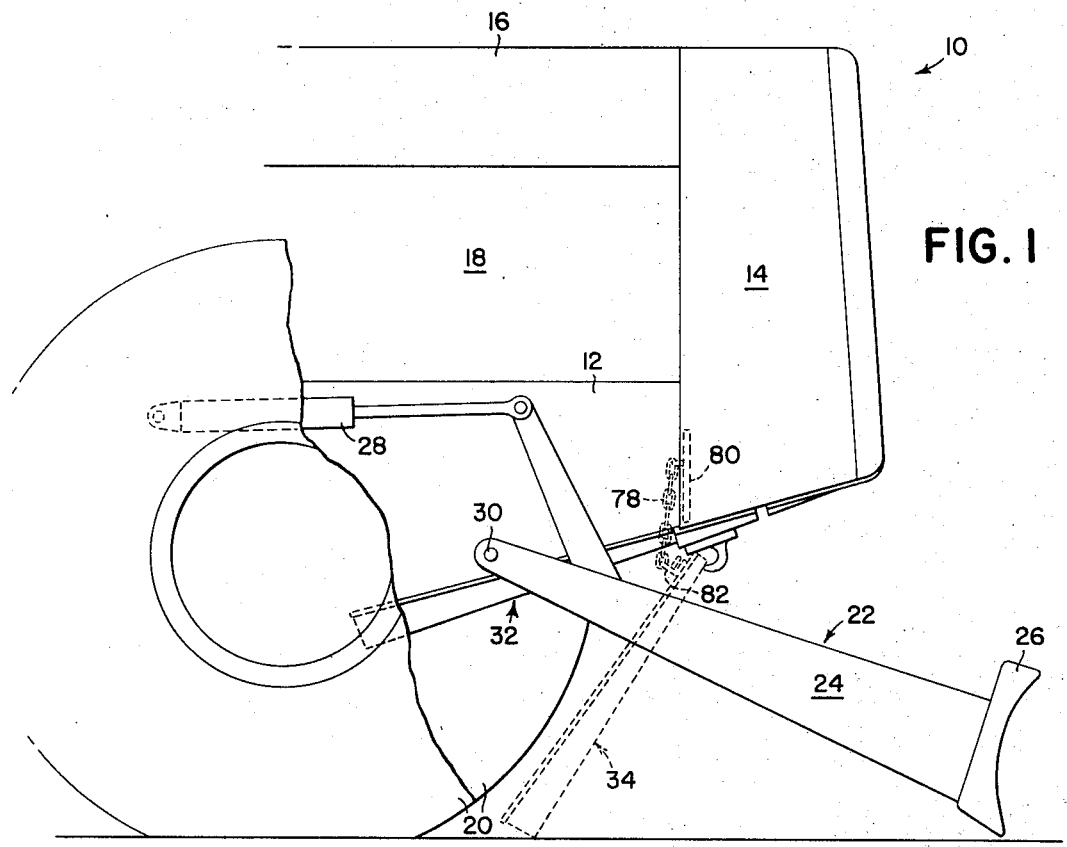
FIG. 1 is a side elevational view of the front end portion of a vehicle embodying a vehicle bottom guard constructed according to the principles of the present invention.

Preliminary to the detailed description following, it is to be understood that the vehicle with which the bottom guard assembly of the present invention is disclosed is merely representative of the types of vehicles with which the bottom guard structure could be used. Also, it is to be noted that some of the vehicle parts described below may be described as existing in pairs while only one of each pair is shown in the drawings. As to these parts, it is to be understood that the undisclosed part is identical to and serves the same purpose as the one which is illustrated.

Referring now to FIG. 1, therein is shown the forward end portion of a skidder tractor which is indicated in its entirety by the reference numeral 10. The skidder front end portion 10 includes a fore-and-aft extending main frame comprising a pair of longitudinal side frame members 12 having a grille housing 14 secured to the forward ends thereof. A hood 16 cooperates with the side frame members 12 and the grille housing 14 to form an engine compartment 18. Supporting the front end portion of the skidder is a pair of ground wheels 20.

A blade assembly 22 is supported by the side frame members 12 and comprises a pair of push arms 24 having a blade 26 fixed to the forward end thereof and having actuators 28 connected to rearward projections at the rearward ends thereof, the actuators being extensible and retractable hydraulic motors which act between the side frame members and the push arms 24 to swing the latter vertically about pivot connections 30 which secure the rear ends of the push arms to the side frame members 12.

Figure 3:
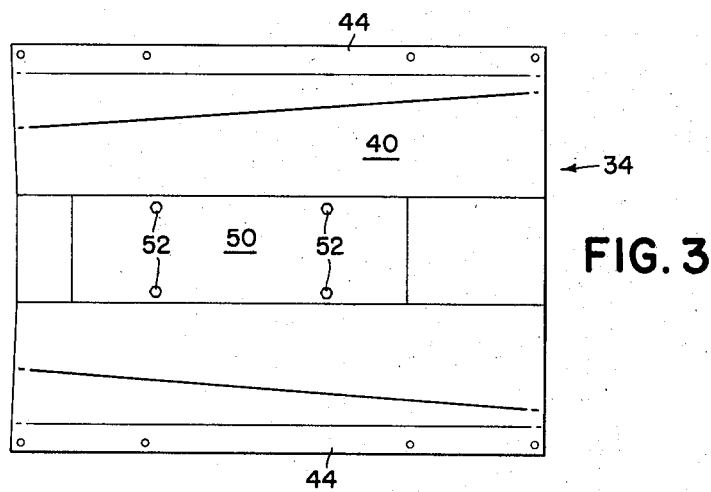
FIG. 3 is a bottom view of the bottom guard plate assembly.

Underlying the front end portion of the skidder is a bottom guard structure 32 including a plate assembly 34 which is substantially rectangular in plane view (see FIG. 3) and extends rearwardly from the grille housing 14 in a position which covers the bottom of an engine housing 36 of an engine located in the engine compartment 18. The plate assembly 34 comprises a main plate 40 and is secured to the vehicle frame through means of a plurality of cap screws 42 which pass through marginal strips 44 at the opposite sides of the main plate and into the bottoms of the side frame members 12. Located centrally in the main plate 40 is a rectangular access opening 46 which permits the operator to have access to vehicle components for effecting routine service and maintenance operations, among which components is an engine oil drain plug 48. The opening 46 also serves to permit debris and other foreign matter to be periodically removed from the top of the plate assembly 34 in a manner to be described below.

Forming a part of the plate assembly 34 and normally blocking the access opening 46 is an access door 50. Four cap screws 52 extend through the access door 50 and are respectively threadedly received in four tabs 54 respectively fixed to a pair of reinforcing ribs 56 extending along and fixed to the top of the main plate 40 at the opposite sides of the access opening 46. The screws 52 thus releasably hold the access door in an installed position wherein it blocks the opening 46. A transverse reinforcing member 58 interconnects the ribs 56 at a location intermediate their opposite ends. For the purpose of reinforcing the access door 50 at areas whereat the cap screws 52 pass therethrough, the door includes a pair of angle members 60 located on its upper side and pointed such that each includes an upwardly projecting transversely extending leg 62. Relative to the forward end of the vehicle, the rearward one of the legs 62 is positioned vertically below and close to engagement with the bottom edge of a transverse main frame member having its opposite ends integrally fixed with the side frame members 12. This positioning of the leg of the angle members 60 with respect to the cross frame member 64 is important as it prevents the access door from becoming unduly bent.

Figure 2:
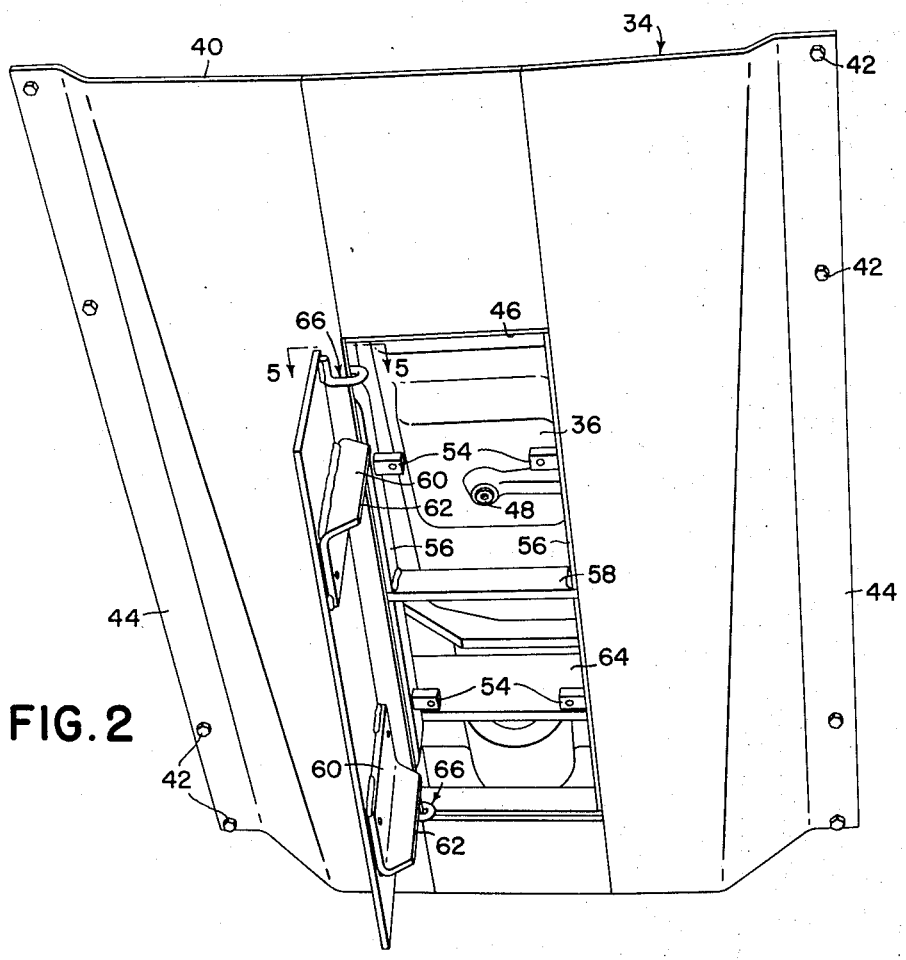
FIG. 2 is a perspective view of the underside of the bottom guard and showing the access door open and exposing the bottom of the vehicle engine.
Figure 4:
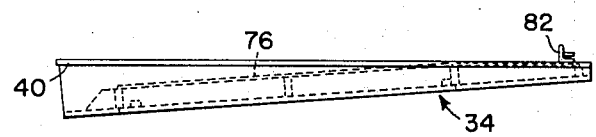
FIG. 4 is a side view of the bottom guard plate assembly.
Figure 5:
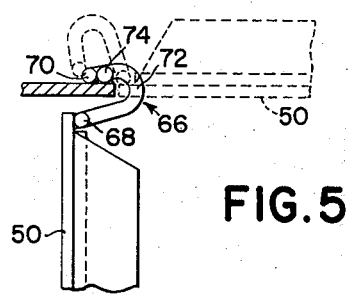
FIG. 5 is a broken view partially in section taken along the line 5—5 of FIG. 2.

For the purpose of aiding an operator in moving the access door 50 between positions respectively covering and uncovering the access opening 46, the left side of the access door, as viewed in FIG. 2, is provided respectively at its opposite ends with a pair of hooks 66. The hooks 66 include first end portions 68 which extend parallel to the left edge of the access door and are fixed thereto as be welding and second end portions 70 which, when considering the access door in its installed position as shown in dashed lines in FIG. 5, is spaced leftwardly of and is located slightly above and extends parallel to the first end portions 68, the end portions 68 and 70 being interconnected by an inverted U-shaped intermediate portion 72. Again as viewed in the dashed line installed position shown in FIG. 5, the U-shaped intermediate portions and the two of the hooks 66 respectively have abutments 74 received therein, the abutments 74 being in the form of a pair of pins rigidly fixed as by weldments to the top surface of the bottom guard main plate 40 adjacent to the access opening 46 in parallel disposition relative to the hook end portions 68 and 70. It is to be noted that the vertical dimension of the abutments 74 is greater than the difference between the levels occupied by the free end portions 70 and the fixed end portions 68 of the hooks 66 when the door is in its installed position. This dimensioning of the abutments 74 assures that upon removal of the cap screws 52, the access door 50 will fall and effect the engagement of the free end portions 70 of the hooks 66 with the abutments 74 thus effecting a hinged joint about which the door is swingable downwardly to an open position as shown in solid lines in FIG. 5. The dimensioning of the pair of abutments 74 relative to the hook opening defined by the open end of the inverted U-shaped intermediate portions 72 permits the removal of the panel only when it is swung to an acute angle of approximately 30° to the access opening and thereafter lifted upwardly until the hinged parts clear each other and then moved sidewards. This procedure is performed in reverse in order to install the access door.

In order to permit the easy cleaning of trash or the like from the top surface of the plate assembly 34, the latter comprises a substantially planar plate structure 76 which overlies and is rigidly fixed to the upper edges of the ribs 56 and additional ribs not shown and thus form a planar trash-receiving area from which trash may be easily swept through the access opening 46 by the hand of an operator.

It may sometimes by necessary to remove the entire plate assembly 34 from the bottom of the vehicle in order to perform major repairs. To aid in this removal and to aid in the reinstallation of the plate assembly 34, the forward end of the plate assembly 34 is connected to the vehicle main frame through means of a flexible element shown here as a length of proof-coil chain 78. Specifically, the chain 78 has a link at one end welded midway between the ends of a cross frame member 80 which extends between and is integral with the side frame members 12; and a link at the other end of the chain being slidably received on a hook 82 fixed to the top of the plate member 76 adjacent the forward end thereof and midway between the opposite sides thereof. The hook 82 has a shape which is similar to that of the hooks 66. The chain 78 has a length which permits the forward end of the plate assembly 34 to drop slightly below the bottom of the vehicle when the cap screws 42 are removed from the plate assembly. The length of chain and the hook 82 thus cooperate to establish means by which the plate assembly 34 is vertically swingable to a lower position as shown in dashed lines in FIG. 1. Thus, the chain serves to suspend one end of the plate assembly 34 when the latter is released from the bottom of the vehicle 10. Such suspension serves to prevent the operator from being injured by the assembly dropping upon him and also aids the operator in the installing of the bottom plate assembly. The operation of the bottom guard structure 32 is recapped as follows. The plate assembly 34 is normally installed in its solid line position shown in FIG. 1 whereat it acts to protect the engine housing bottom 36 from damage which would otherwise be caused from the bottom impacting logs, boulders and the like. If the vehicle to which the bottom guard structure is attached is operating in conditions that result in flammable debris finding its way to the top of the plate assembly 34, this debris may easily be removed through the access opening 46 by removing the cap screws from the door thus permitting the latter to swing downwardly about the pivot access formed by the cooperation of the hooks 66 and the abutments 74. When the access door is hanging free as shown in solid lines in FIG. 5, the flammable material can then be removed from the top of the plate member 76 by merely sweeping the hand across the plate and toward the access opening. It is here noted that the hooks 66 and abutments 74 will cooperate to form a workable hinge joint even after the plate assembly 34 has become bent during operation.

Of course, the access door 46 is released to assume its free hanging position shown in FIG. 5 in the above-described manner when it is desired to drain the oil from the tractor engine by removing the oil drain plug 48.

Should it be desired to remove the entire plate assembly 34 from the bottom of the vehicle, it is necessary only to remove the cap screws 42 starting from the front and proceeding towards the rear of the plate assembly which results in the front of the plate first dropping down to a position whereat the chain 78 supports the forward end of the plate assembly, the removal of the rearward cap screws then permitting the plate assembly 34 to swing downwardly and forwardly about the connection of the hook 82 with the chain 78. Reinstallation of the plate assembly is accomplished in the reverse order, it being noted that the chain 78 is of a length which permits only minimal sideways movement of the front end of the assembly before it contacts the underside of the vehicle. Thus, it will be appreciated that the length of the chain 78 is somewhat critical since it must be long enough to permit the assembly to drop below the vehicle underside and at the same time be short enough to stabilize the front end of the assembly 34 during reinstallation of the latter.

It is also to be noted that the reinforcing ribs sandwiched between the main plate 40 and the plate member 76 act to prevent the plate assembly 34 from becoming unduly bent so as to prevent the swinging of the access door to its free hanging position. Also, the flat construction of the upper side of the plate assembly 34 not only serves to provide a planar debris-collecting surface as aforementioned but also it serves to permit the plate assembly 34 to be driven over by the vehicle to straighten bends from the plate assembly 34 if desired.

I claim:

1. In a tractor of the type including an engine supported by a main frame, an engine bottom guard structure comprising: a plate means extending below said engine and being releasably secured to said frame; said plate means having a generally rectangular access opening therein located below said engine; a generally rectangular access door being dimensioned complementary to said opening; fastening means releasably securing said door in a first position wherein the door closes the opening and has a bottom surface extending substantially coplanar with the bottom of said plate means; abutment means fixed to the top surface of said plate means and extending along one side of said opening; said abutment means including surface means generally paralleling and facing away from one side of said opening; hook means fixed to the top surface of said door next to that door side which is adjacent to said one side of said opening when the door is in said first position and including free end portion means disposed for engaging said surface means when said fastening means are released; said hook means and abutment means cooperating as sole means for hingedly supporting said door from said plate means when said fastening means are released.

2. The tractor defined in claim 1 wherein said abutment means is in the form of cylindrical pin means and said hook means including at least two spaced hooks and each hook including a rod having one end fixed to said door and having a free end portion forming a part of said free end portion means and spaced to one side of said door and extending parallel to said door side and having an intermediate inverted U-shaped portion, as considered when the door is in said first position, extending between said one and free ends; and each free end portion being spaced above the top surface of said plate means and located at the opposite side of said cylindrical pin means from said one end when said door is in said first position.

3. The tractor defined in claim 1 and wherein said plate means includes a lower main plate having a plurality of reinforcing ribs of substantially equal height being fixed to the top side thereof; and a planar plate being secured in overlying relationship to said ribs and defining an opening which is vertically coextensive with said access opening whereby debris finding its way to the top of said bottom guard may be cleaned therefrom by first removing the access door and by then sweeping the debris across the planar plate and into the access opening.

4. The tractor defined in claim 1 and further including a connection means secured to the top of said plate means at a central location adjacent one end thereof; said main frame including a member located directly above said connection means; a flexible element extending between and being secured to said frame member and connection means, said flexible element being of a length sufficient for permitting the one end of said plate means to drop slightly below the bottom of the vehicle when said plate means is released from said frame at all points exclusive of the connection means.

5. The tractor defined in claim 4 wherein said flexible element is a length of proof-coil chain and said connection means is a hook including a rod having one end fixed to said plate means and having a free end portion spaced above said plate means and extending crosswise to said one end of the plate means and having an intermediate inverted U-shaped portion extending between the fixed end and the free end portion; and said chain having a link received on said hook and located in said inverted U-shaped portion.

6. The tractor defined in claim 1 wherein said access door includes tranversely extending reinforcing ribs on its upper side, at least one portion of said main frame extending above and spanning said access opening and at least a portion of said ribs being positioned vertically below and close to engagement with the bottom side of said one portion of said main frame whereby said portion of said ribs of the access door will engage said one portion of the frame when the door is bent a slight amount upwardly by obstacles engaged by the door during operation, the door thus being prevented from being extensively bent.

7. The tractor defined in claim 1 wherein said hook means is spaced from said plate and said abutment means when the access door is in said first position.

* * * * *